3,055,938
N₁-PERFLUOROALKANOYL-N₂-ARYL-
METHYLENE-HYDRAZINE
David C. Remy, Madison, Wis., assignor to E. I. du Pont de Nemours and Company, Wilmington, Del., a corporation of Delaware
No Drawing. Filed Jan. 31, 1961, Ser. No. 85,996
2 Claims. (Cl. 260—562)

This invention relates to novel fluorinated compounds and more particularly to N₁-perfluoroacyl-N₂-arylmethylene hydrazines.

It is an object of the present invention to provide novel fluorinated organic compounds. A further object is to provide N₁-perfluoroacyl-N₂-arylmethylene hydrazines which have excellent thermal stability. A still further object is to provide a process for the preparation of these hydrazides.

These and other objects of this invention are accomplished by providing N₁-perfluoroacyl-N₂-arylmethylene hydrazines which may be represented by the formula

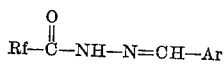

wherein Rf is a monovalent perfluoroalkyl radical having at least 3 carbon atoms, with the residual valence being on a carbon atom and Ar is an aromatic hydrocarbon radical of from 6 to 18 carbon atoms which radical may be optionally substituted by alkyl radicals, alkoxy radicals or halogen atoms, with the residual valence of said aromatic hydrocarbon radical being on a carbon atom. For purposes of the present invention, it is preferred that the perfluoroalkyl radical, Rf, contain from about 3 to 13 carbon atoms and that the alkyl and alkoxy substituents on the Ar radical be lower alkyl and lower alkoxy. The halogen substituents on the Ar radical include chlorine, bromine, fluorine and iodine.

The term "perfluoroalkyl radical" as used throughout the specification and claims refers to an alkyl radical wherein all of the hydrogen atoms have been replaced by fluorine atoms. A perfluoroalkyl radical accordingly contains only carbon and fluorine atoms. The carbon atoms therein are joined by carbon-to-carbon single bonds and each fluorine atom therein is joined only to a carbon atom.

Representative examples of N₁-perfluoroacyl-N₂-arylmethylene hydrazines within the scope of the present invention are N₁-heptafluorobutyryl-N₂-benzylidene hydrazine (also called N-phenyl methylene heptafluorobutyrohydrazide or N-benzalheptafluorobutyrohydrazide);
N₁-heptafluorobutyryl-N₂-2-chlorobenzylidene hydrazine;
N₁-heptafluorobutyryl-N₂-2-fluorobenzylidene hydrazine;
N₁-heptafluorobutyryl-N₂-3-iodobenzylidene hydrazine;
N₁-heptafluorobutyryl-N₂-4-methoxybenzylidene hydrazine
N₁-heptafluorobutyryl-N₂-β-naphthylmethylene hydrazine;
N₁-heptafluorobutyryl-N₂-3-pyrenylmethylene hydrazine;
N₁-nonafluorovaleryl-N₂-3-methylbenzylidene hydrazine;
N₁-nonafluorovaleryl-N₂-4-isopropylbenzylidene hydrazine;
N₁-nonafluorovaleryl-N₂-2,4,5-trimethylbenzylidene hydrazine;
N₁-nonafluorovaleryl-N₂-α-naphthylmethylene hydrazine;
N₁-nonafluorovaleryl-N₂-2-biphenylylmethylene hydrazine;
N₁-hendecafluorocaproyl-N₂-9-fluorenylmethylene hydrazine;
N₁-hendecafluorocaproyl-N₂-benzylidene hydrazine;
N₁-pentadecafluorocaprylyl-N₂-4-chlorobenzylidene hydrazine;
N₁-pentadecafluorocaprylyl-N₂-4-fluorobenzylidene hydrazine;
N₁-pentadecafluorocaprylyl-N₂-2-phenanthrylmethylene hydrazine;
N₁-nonadecafluorocapryl-N₂-2,4-dichlorobenzylidene hydrazine;
N₁-nonadecafluorocapryl-N₂-3,4,5-trimethoxybenzylidene hydrazine;
N₁-nonadecafluorocapyryl-N₂-3-bromobenzylidene hydrazine;
N₁-nonadecafluorocapyryl-N₂-3-ethoxy-4-methoxybenzylidene hydrazine;
N₁-tricosafluorolauroyl-N₂-4-tert-butylbenzylidene hydrazine; and
Heptacosafluoromyristoyl-N₂-2-bromo-6-chlorobenzylidene hydrazine.

The N₁-perfluoroacyl-N₂-arylmethylene hydrazines are made by reacting a perfluoroacylhydrazide with aromatic aldehyde; stoichiometric proportions are not necessary but it is preferred to use a slight molar excess (about 10 to 20%) of the aldehyde. This reaction may be illustrated by the following equation

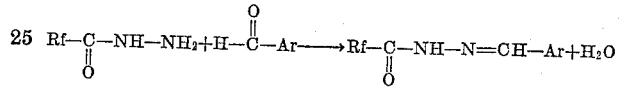

In a representative procedure, the aldehyde is added at atmospheric pressure to the perfluoroacylhydrazide, at 20 to 30° C. in absolute ethanol and subsequently the mixture is agitated at reflux. If desired, the water formed can be distilled off as an azeotropic mixture. The course of the reaction can be followed by measuring the amount of water obtained. When the reaction is finished, conventional procedures are used to isolate the product. Thus phases are separated when the product is an immiscible liquid; the product may be collected by filtration when it is an insoluble solid or a large volume of water may be added to cause phase separation when the product is soluble. The hydrazines may be purified by dissolving them in a water-immiscible organic solvent, e.g. diethyl ether and washing the solution, in turn, with saturated aqueous sodium bisulfite, 20% aqeous potassium hydroxide, and water. Removal of the solvent yields the N₁-perfluoroacyl-N₂-arylmethylene hydrazine.

When preparing these novel hydrazine compounds, alcohols boiling higher than ethanol can be used as solvents. Sub or super atmospheric pressures may be selected. The preferred temperatures for convenient operation range from about 15° C. to 90° C.

The perfluoroacylhydrazides themselves are made by reacting a molar excess (e.g. 50 to 100%) of hydrazine hydrate with an alcoholic solution of the corresponding perfluoroacyl ester (e.g. ethyl heptafluorobutyrate) in accordance with the general procedure for the dihydrazides given in U.S. Patent 2,515,246. In a representative procedure with ethyl heptafluorobutyrate, the mixture was heated at reflux at atmospheric pressure in ethanol for four hours; removal of the solvent by conventional distillation then left the hydrazide.

The N₁-perfluoroacyl-N₂-arylmethylene hydrazines of the present invention are useful in that they exhibit outstanding thermal stability and may be employed as heat transfer media. When molten they may be pumped through jacketed reactors, condensers, heat exchangers and pipes made of steel, stainless steel, glass, and other conventional materials for confining heat transfer media. Thus they can be used in equipment for molding plastic and rubber goods, processing paints, varnishes, and food products, fractionating petroleum, heating chemical process equipment, heating rotating drums and coating coils, and evaporating high-boiling solvents.

The following example will better illustrate the nature of the present invention; however, the invention is not intended to be limited to this example. Parts are by weight unless otherwise indicated.

EXAMPLE (a) *Ethylheptafluorobutyrate*

A solution of 55.4 grams of heptafluorobutyric acid of 110 milliliters of absolute ethanol and 1 milliliter of concentrated sulfuric acid was refluxed three hours. The reflux condenser was replaced by a Vigreux column at this time, and ethanol and the ester distilled from reaction vessel. Although pure ethyl heptafluorobutyrate boils at 95° C. (744 mm. Hg), in excess ethanol all of the ester distills with the ethanol, and the observed boiling point never exceeds 78° C. When the reaction flask was almost dry, 50 milliliters of ethanol was added and the distillation continued. This distillate, an ethanolic solution of the ester could be used directly for the preparation of heptafluorobutyrohydrazide.

(b) *Heptafluorobutyrohydrazide*

To the ethanol solution of ethyl heptafluorobutyrate obtained by the above procedure was added 13.5 grams of freshly distilled hydrazine hydrate. The solution was refluxed gently for four hours after which time the ethanol was removed by distillation. The residue, a colorless syrup, crystallized on cooling. The material was collected by filtration using ice water to rinse the crystals. After drying, there was obtained 53.0 grams of white crystals; the filtrate yielded an additional 1.5 grams of material (total yield 92%). An analytical sample was prepared by recrystallization from water, M.P. 79–80°.

*Analysis.*—Calcd. for $C_4H_3F_7ON_2$: C, 21.06; H, 1.33; F, 58.31; N, 12.28. Found: C, 21.2, 21.1; H, 1.3, 1.4; F, 58.3, 58.6; N, 12.1, 12.4.

(c) *Reaction of Heptafluorobutyrohydrazide and Benzaldehyde To Yield $N_1$-Heptafluorobutyryl-$N_2$-Benzylidene Hydrazine*

To a solution of 10.0 grams (0.044 mole) of heptafluorobutyrohydrazide in 50 milliliters of ethanol at about 25° C. and atmospheric pressure was added 5.3 grams (0.05 mole) of benzaldehyde dissolved in 25 milliliters of ethanol. After stirring had been started, a slightly exothermic reaction occurred. Thirty minutes later, external heat was applied; the solution was brought to reflux and agitated at reflux for one hour. After 25 milliliters of a saturated aqueous solution of sodium bisulfite and 200 milliliters of water had been added, in turn, a fluffy white precipitate formed. This precipitate was removed by filtration, washed with water, and dried to give 11.11 grams (80% yield) of $N_1$-heptafluorobutyryl-$N_2$-benzylidene hydrazine. Recrystallization from an ethanol-hexane mixture resulted in sparkling white flakes, M.P. 104–105°. The ultraviolet absorption of a solution in 95% ethanol exhibited peaks at 281 millimicrons (log ε: 4.29); and 217 millimicrons (log ε: 4.13).

*Analysis.*—Calcd. for $C_{11}H_7F_7N_2O$: C, 41.78; H, 2.23; F, 42.06; N, 8.86. Found: C, 42.5, 42.5; H, 2.4, 2.5; F, 42.0, 41.9; N, 9.2, 9.3.

As many widely different embodiments of this invention may be made without departing from the spirit and scope thereof, it is to be understood that this invention is not limited to the specific embodiments thereof except as defined in the appended claims.

What is claimed is:

1. A compound having the formula

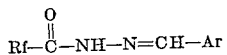

wherein Rf is a monovalent perfluoroalkyl group having from 3 to 13 carbon atoms and Ar is selected from the group consisting of a monovalent 6 to 18 carbon atom aromatic hydrocarbon group, a monovalent alkyl substituted 6 to 18 carbon atom aromatic hydrocarbon group, a monovalent alkoxy substituted 6 to 18 carbon atom aromatic hydrocarbon group and a monovalent halogen substituted 6 to 18 carbon atom aromatic hydrocarbon group.

2. $N_1$-heptafluorobutyryl-$N_2$-benzylidene hydrazine.

References Cited in the file of this patent

UNITED STATES PATENTS

| | | |
|---|---|---|
| 2,567,011 | Diesslin et al. | Sept. 4, 1951 |
| 2,670,348 | Gregory et al. | Feb. 23, 1954 |
| 2,824,884 | Barnhart et al. | Feb. 25, 1958 |
| 2,828,314 | Yale et al. | Mar. 25, 1958 |
| 2,928,875 | Martin et al. | Mar. 15, 1960 |

FOREIGN PATENTS

| | | |
|---|---|---|
| 1,204,741 | France | Jan. 27, 1960 |

OTHER REFERENCES

Noller: "Chemistry of Organic Compounds," published by W. B. Saunders Co., Philadelphia, pages 35–41 (1951).